United States Patent
Machell (10) Patent No.: US 7,985,913 B2
(45) Date of Patent: Jul. 26, 2011

(54) BRAILLE MUSIC SYSTEMS AND METHODS

(76) Inventor: Lydia Machell, Leeds (GB)

( * ) Notice: Subject to any disclaimer, the term of this patent is extended or adjusted under 35 U.S.C. 154(b) by 120 days.

(21) Appl. No.: 12/182,884

(22) Filed: Jul. 30, 2008

(65) Prior Publication Data
US 2008/0307946 A1 Dec. 18, 2008

Related U.S. Application Data

(63) Continuation of application No. PCT/US2007/003222, filed on Feb. 5, 2007.

(60) Provisional application No. 60/765,625, filed on Feb. 6, 2006.

(51) Int. Cl.
G09B 15/02 (2006.01)
G09B 21/00 (2006.01)
G10H 7/00 (2006.01)

(52) U.S. Cl. ............. 84/609; 84/475; 84/483.1; 84/614; 84/644; 84/645; 434/114

(58) Field of Classification Search .................... 84/609
See application file for complete search history.

(56) References Cited

U.S. PATENT DOCUMENTS

| 3,880,269 | A | * | 4/1975 | Carbonneau | 400/109.1 |
| 5,146,833 | A | * | 9/1992 | Lui | 84/462 |
| 6,827,512 | B1 | * | 12/2004 | Souluer | 400/483 |
| 2004/0206225 | A1 | | 10/2004 | Wedel | |
| 2005/0099318 | A1 | | 5/2005 | Gilfix et al. | |

OTHER PUBLICATIONS

New International Manual of Braille Music Notation, 'Music Braille Table of Signs', 1999, North Carolina Central University and the Governor Morehead School for the Blind.*

* cited by examiner

*Primary Examiner* — Elvin G Enad
*Assistant Examiner* — Christopher Uhlir
(74) *Attorney, Agent, or Firm* — Akerman Senterfitt (57) ABSTRACT

Methods and systems for converting digital music scores to Braille, and vice versa and for creating Braille and digital music scores directly from music keyboard entry. The system and methods are embodied in computer programs which can extract note data from a digital score or Midi file, and correlate the note data with Braille cell data in a computer processor. A digital Braille score is created from the Braille cell data, and can be output as an embossed score, as a printed simulated Braille score or on a refreshable Braille display. The computer programs can also create digital scores from input Braille scores. Hardware components can include a music keyboard having a processor, a digital storage device and an integrated refreshable Braille display.

21 Claims, 5 Drawing Sheets

BRAILLE MUSIC SYSTEMS AND METHODS

BACKGROUND

1. Field of the Invention

The present invention relates to Braille music systems and software methods, and more particularly to music software methods and systems for converting musical scores to Braille, and vice versa.

2. Description of the Related Art

The entry or typing of Braille notation is commonly achieved using a dedicated six-key Braille typewriter or note taker. A Braille typewriter produces hard copy embossed Braille output, whereas a Braille note taker used with a computer produces a digital file. As Braille note takers are very expensive to purchase, they are thus not readily available to all users who wish to be able to produce Braille notation.

For sighted musicians, musical score software has become popular, enabling a musician to either write a score directly into the software, capture notes on a music keyboard, or to purchase digital files containing the score from the music publisher. For blind or visually impaired musicians, it is more difficult to obtain musical scores, because such scores must be transcribed into Braille notation, which is typically carried out on an individual order basis. The transcription may be done manually or with a combination of software applications followed by manual editing. In either case, the transcription of scores into Braille can be a lengthy process, often taking weeks to months to achieve. Musical scores are thus not as accessible to blind or visually impaired musicians as they are to sighted musicians.

It is also difficult for blind or visually impaired musicians to create their own scores, either in Braille or in print. If the blind or visually impaired musician creates a score using a Braille note taker or typewriter, it is very difficult for them to check their work for accuracy as they create it, because there is no aural feedback mechanism to enable them to listen to the score as they create it.

SUMMARY OF THE INVENTION

According to a first aspect of the present invention, a system for producing Braille musical scores includes means for extracting music note data from a digital music data input. Means for correlating the music note data with Braille cell identification information in a computer processor are also included. The system further includes means for creating a digital. Braille music score from the Braille cell identification information, and means for outputting a Braille music score from the created digital Braille music score.

The system also includes means for transcribing the Braille music score into a standard print notation in a digital music output.

The digital music data input can be selected from the group consisting of digital musical score files and digital music files. In a preferred arrangement, the digital music files can be Midi files or other metadata such as MusicXML. In another preferred arrangement, the digital musical score files can be Sibelius®, Finale® or any other suitable musical score file. In one arrangement, the digital music files can be created on a music keyboard, with duration information relating to musical notes played on the music keyboard input using assigned keys on the music keyboard. The digital music data input can in another arrangement include chords played on a music keyboard, the chords played on keys assigned for Braille input and corresponding to Braille cells.

The means for correlating the music note data with Braille cell identification information can include a database containing Braille cell identification which is correlated to each item of music note data. The music note data comprises at least one of pitch information, duration information, tempo information, key information, and text information.

The means for outputting a Braille music score can be an embosser for printing an embossed score, a printer for printing a simulated Braille score, a display for displaying a simulated Braille score, or a refreshable Braille display for tactile reading of the score, or a combination thereof.

According to a second aspect of the invention, a method for producing Braille musical scores can include the steps of: extracting music note data from a digital music data input, and correlating the music note data with Braille cell data. in a computer processor. A digital Braille music score is created from the Braille cell data, and a Braille music score is output from the created digital Braille music score.

The digital music data input can be selected from the group consisting of digital musical score files and digital music files. In a preferred arrangement, the digital music files can be Midi files or MusicXML files. The digital musical score files can be Sibelius®, Finale® or any other suitable musical score file. In one arrangement, the digital music files are created on a music keyboard, and duration information relating to musical notes played on the music keyboard is input using assigned keys on the music keyboard. In another arrangement, the digital music data input can be formed from chords played on a music keyboard, the chords played on keys assigned for Braille input and corresponding to Braille cells.

The step of correlating the music note data with Braille cell data can include assigning a Braille cell identification to each item of music note data, and creating a database containing the assigned Braille cell data. The music note data can include at least one of pitch information, duration information, tempo information, key information and text information. Non-note data may also be correlated with Braille cell data.

The outputted Braille music score can be an embossed score, a printed or displayed simulated Braille score, or output on a refreshable Braille display, or a combination thereof.

In a variation of the second aspect of the invention a Braille musical score can be translated into a format usable by sighted musicians. The method includes extracting Braille identification information from a digital Braille music score, correlating the Braille cell data with music note data and non-note information such as text and lines in a computer processor, creating a digital music data file from the music note data, and outputting the digital music data file.

A third aspect of the invention relates to a machine-readable storage medium having stored thereon a computer program having a plurality of code sections, the code sections executable by a machine for causing the machine to perform the steps of: extracting music note data from a digital music data input; correlating the music note data with Braille cell data in a computer processor; creating a digital Braille music score from the Braille cell data; and outputting a Braille music score from the created digital Braille music score.

A fourth aspect of the invention relates to a musical instrument which includes a processor, a music keyboard connected to the processor, and a refreshable Braille display connected to the processor. The refreshable Braille display displays a Braille music score output by the processor.

The processor can receive as input musical notes played on the music keyboard, can translate the musical note input into Braille cell identifications, and can display the identified Braille cells on the refreshable Braille display. In one arrangement, the processor assigns six keys of the music keyboard as Braille input keys, and chords played on the Braille input keys are converted in the processor to Braille cell identifications. In another arrangement, the processor can additionally assign keys of the music keyboard to represent duration information, and other keys of the music keyboard to represent pitch information. The musical note input can therefore be accomplished using step-time input. The processor creates an intermediate music score incorporating the pitch and duration information, together with chords representing six-key Braille input. The intermediate score can then be used as the basis for correlating the musical note data contained therein with Braille cell information.

The refreshable Braille display can be provided above the music keyboard. In a preferred arrangement, the refreshable Braille display and the music keyboard are provided in one piece.

Another aspect of the invention provides a system for creating Braille notation, which can include a processor, and a music keyboard connected to the processor. The processor can be directly incorporated into the music keyboard, or can be provided in a separate computer. The processor is loaded with software which assigns six keys of the music keyboard to Braille entry, such that depression of any of the assigned six keys, either singly or as a chord, are interpreted by the processor as a Braille cell.

It should be noted that various aspects of the invention can be implemented as a program for controlling computing equipment to implement the functions described herein, or a program for enabling computing equipment to perform processes corresponding to the steps disclosed herein. This program may be provided by storing the program in a magnetic disk, an optical disk, a semiconductor memory, any other recording medium, or can also be provided as a digitally encoded signal conveyed via a carrier wave. The described program can be a single program or can be implemented as multiple subprograms, each of which interact within a single computing device or interact in a distributed fashion across a network space.

BRIEF DESCRIPTION OF THE DRAWINGS

There is shown in the drawings embodiments which are presently preferred, it being understood, however, that the invention is not limited to the precise arrangements and instrumentalities shown.

DETAILED DESCRIPTION OF THE INVENTION

In this description and in the appended claims, the term "digital music score" has been used to describe a music notation score created using a digital music notation system such as Sibelius®, Finale®, MusicXML and any other suitable music notation system. The term "digital music file" is intended to cover any form of digital music file that has been stored using MIDI and any other suitable music storage system.

Figure 1:
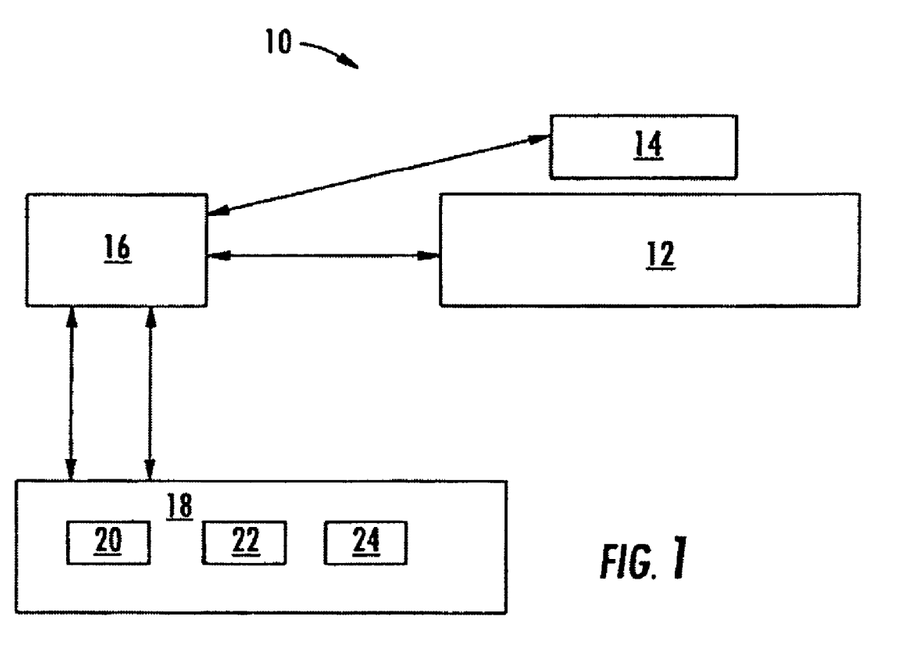
FIG. 1 is a schematic diagram illustrating a Braille music, software system incorporating various components in accordance with the invention.

Referring to the drawings, a Braille music software system 10 can comprise various components in accordance with the invention. The system can include a musical instrument, such as a keyboard 12, which is typically a synthesizer, output device 14 such as a refreshable Braille display, and a processor 16 running software 18. The music keyboard 12 and the refreshable Braille display 14 are preferably integrated as one piece of equipment, or may be provided separately. The refreshable Braille display 14 may be provided above the music keyboard 12, or it may be repositionable such that the user may place the refreshable Braille display 14 at a position that is most comfortable for them to use. In other arrangements, instead of a refreshable Braille display, the output device 14 can be an embosser such as a Braille embosser, a printer for printing a simulated Braille score, or a display for displaying a simulated Braille score.

The software 18 can include various components such as: a print-to-Braille transcriber 20, which can convert digital music scores to Braille scores: a Braille-to-print transcriber 22, which can convert Braille scores to digital music scores that may then be printed; and a Midi-Braille interpreter 24, which can convert Midi pitches to Braille. It should be noted that a standard music notation score can be derived from the created Braille score and saved as a Midi file but non-note data may be lost. Other program components may be added as desired. The components may be purchased and used separately, or may be used in cooperation with one another in a complete system.

Figure 2:
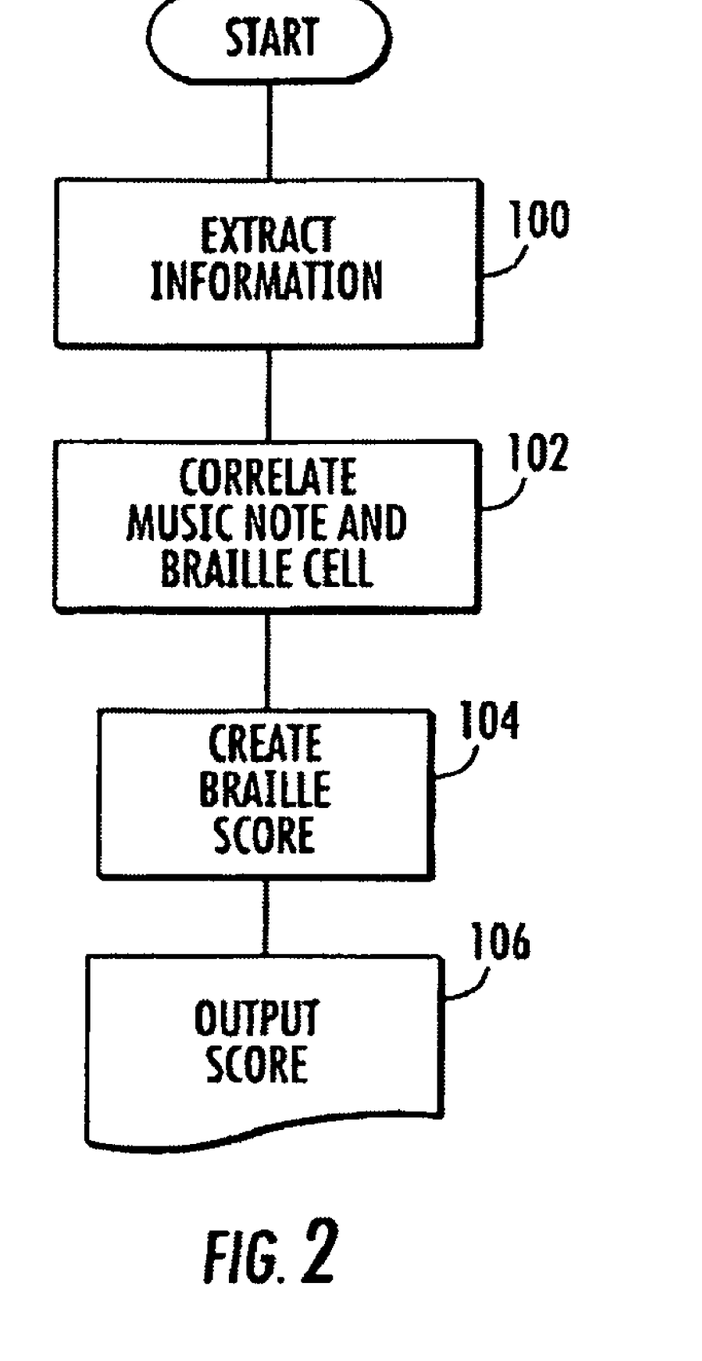
FIG. 2 is a flowchart illustrating a method for creating a Braille file (literary or musical) from a digital music data input in accordance with the invention.

All the software components can essentially use the method set out in FIG. 2. In this method, at step 100, music note data is extracted from a digital music data input, which may be a digital musical score file or a digital music file such as a Midi file. The music note data includes note data such as pitch identification and duration information, and any suitable non-note data such as text, as well as lines and symbols such as crescendos and dal segnos, and is correlated with Braille cell data in a computer processor at step 102. At step 104, a digital Braille music score is created from the Braille cell data. The outputting of a Braille music score from the created digital Braille music score is at step 106. The various components can use different data input formats, and output data in differing formats, as outlined below.

The print-to-Braille transcriber 20 is a software component which receives entry in the form of a digital musical score file, and transcribes it into musical Braille notation for embossing or displaying. The digital musical score: file may have been created in Sibelius® or Finale® music notation software systems or any other digital musical score program or format such as MusicXML, SCORE, NIFF, Logical Score, PrintMusic and the like. The print-to-Braille transcriber can extract both music note information such as pitch and duration information, and non-note information such as text and line information from the digital music score. The print-to-Braille transcriber can also include a database, such as a lookup table for each music notation software file format, which correlates each musical note, non-note and other relevant score information with a Braille cell to create a digital Braille music score, which is in the form of a text Braille notation file. The Braille notation file comprising the Braille music score can then be output by embossing a Braille music score, printing or displaying a simulated Braille music score, or displaying the Braille cells on a refreshable Braille display (RBD). Thus, a user can take a score that is provided in a known music software program for sighted musicians, and can easily and quickly convert the musical notation into Braille notation. The print-to-Braille transcriber may be a plug-in component for a software program, such as a musical notation software system, or may be a stand-alone program.

The Braille-to-print transcriber 22 operates similarly to the print-to-Braille transcriber 20, and takes work that has been written directly in Braille either using the other components of the invention or obtained externally, and transcribes it into a digital musical score that can be viewed or printed by sighted musicians, using known music score software programs. An optical Braille recognition scanner may also be used to scan embossed music scores. The Braille-to-print transcriber 22 can employ the same databases as the print-to-Braille transcriber 20, although the method used in the Braille-to-print transcriber 22 is essentially the reverse of that used in the print-to-Braille transcriber in that it is the Braille identification information that is extracted from a digital Braille music score, and the digital music data file that is output at the final step. The Braille-to-print transcriber 22 can perform the function of providing aural feedback to a musician using or creating the Braille music score. This is achieved using the playback function of a music software system such as Sibelius® once the Braille music score has been converted into a digital music score. In this way, a blind or partially sighted musician can take a Braille score, or a portion of a Braille score, and can quickly and easily play that score to check for accuracy, rather than manually reading the Braille score and playing it back themselves.

A Midi-Braille interpreter 24 can be another component of the system. The Midi-Braille interpreter is a software element which can interpret Midi pitch information, and output the information as Braille cells. It should be noted that a standard Midi file, which is a recording of a musical work, may be created as a recorded performance on a Midi keyboard of a piece played into the keyboard in "real time" (as opposed to "step-time"). The resulting Midi file will contain data such as pitch, duration, velocity and channel which "describe" the performance. While music notation applications such as Sibelius® and the like try to support the importation of standard Midi files, this is an inefficient process for score creation as the "live" performance rarely conforms to the strict mathematical requirements of notation. However, Midi data may be used as a data transfer standard, and may therefore be used for data input in a manner other than recording a "live" performance. In a Midi file, numbers are assigned to pitches (for example, middle C=60). The Midi-Braille interpreter can extract this pitch information, or can use previously extracted information, or a user-created data score comprised of the pitch information, and can compile Braille cells representing either music or text therefrom, using information as presented in Tables A-C. This enables Braille music notation to be created directly from Midi files or from digital scores which include Midi pitch information, which is more complicated than creating Braille music notation from digital music scores. It will be appreciated that, although the invention is described with reference to Midi files, this is exemplary only, as other music data files may be used.

The Midi-Braille interpreter allows a musician to create a Midi file for use in creating a musical score, for example, by allowing the musician to enter pitch and duration information using Midi information. The Midi-Braille interpreter can correlate Braille cells to pitches in a data score by using Midi pitch numbers as a code or programming language. The data score itself can be saved in Midi file format, as well as input into Sibelius® or another score-writer via a keyboard, and this is desirable because of the universality of the Midi standard. The resultant Midi file is not a performance version of the resulting score but a record of code in the form of notes in the intermediary "data score".

The input of duration information has previously been difficult for blind or visually impaired musicians to do if they wish to use the step-time method of input, which has traditionally been done using a computer keyboard. In accordance with the present invention, step-time input may be achieved using a musical keyboard. Additionally, the present invention allows the input of notes using a six key entry system. Thus, two different systems can be employed to create the Midi file.

The first system allows six keys of a standard music keyboard to emulate the function of a Braille typewriter or notetaker. Currently, Braille is typed on a Braille typewriter using six: keys, with the typist holding down simultaneously each key needed for each dot in a Braille cell. Dedicated Braille notetakers and typewriters are expensive, and modern PC keyboards are not able to function as six key input devices because the simultaneous key depression necessary is no longer supported. With the Midi-Braille interpreter, certain keys on a music keyboard can be treated as equivalent to six key Braille typewriter keys, in a Braille Typewriter mode. When chords within this certain range of keys are played into a data score (the file which will be analysed by the Midi-Braille interpreter), a blind musician or other Braille-literate person can type Braille using a music keyboard that is already available in their studio. This same method can be used to create literary and mathematical Braille as well as Braille music notation, and it will be appreciated that this component of the system has many uses outside the field of music. This system would primarily be used by a Braille-literate, person who knows Braille music notation.

The second system of entry is triggered by pitches in the upper range of the keyboard. This emulates the "step-time" system of note input employed by many, notation applications in the production of standard print scores. Because musical scores contain text elements as well as notes, both six-key and step-time input can be combined to produce a score. Conversely, six-key input can be used alone to produce a literary Braille file, or mathematical code, because the use of the six-key input on the music keyboard is not limited solely to the production of musical scores. It will be appreciated that the invention is not limited to the creation of files using the systems described herein. A pre-prepared Midi file may be input into the system for conversion to a Braille file. A pre-prepared notation file (such as Sibelius®) from which Midi pitch information could be extracted may also be input into the system.

Figure 3:
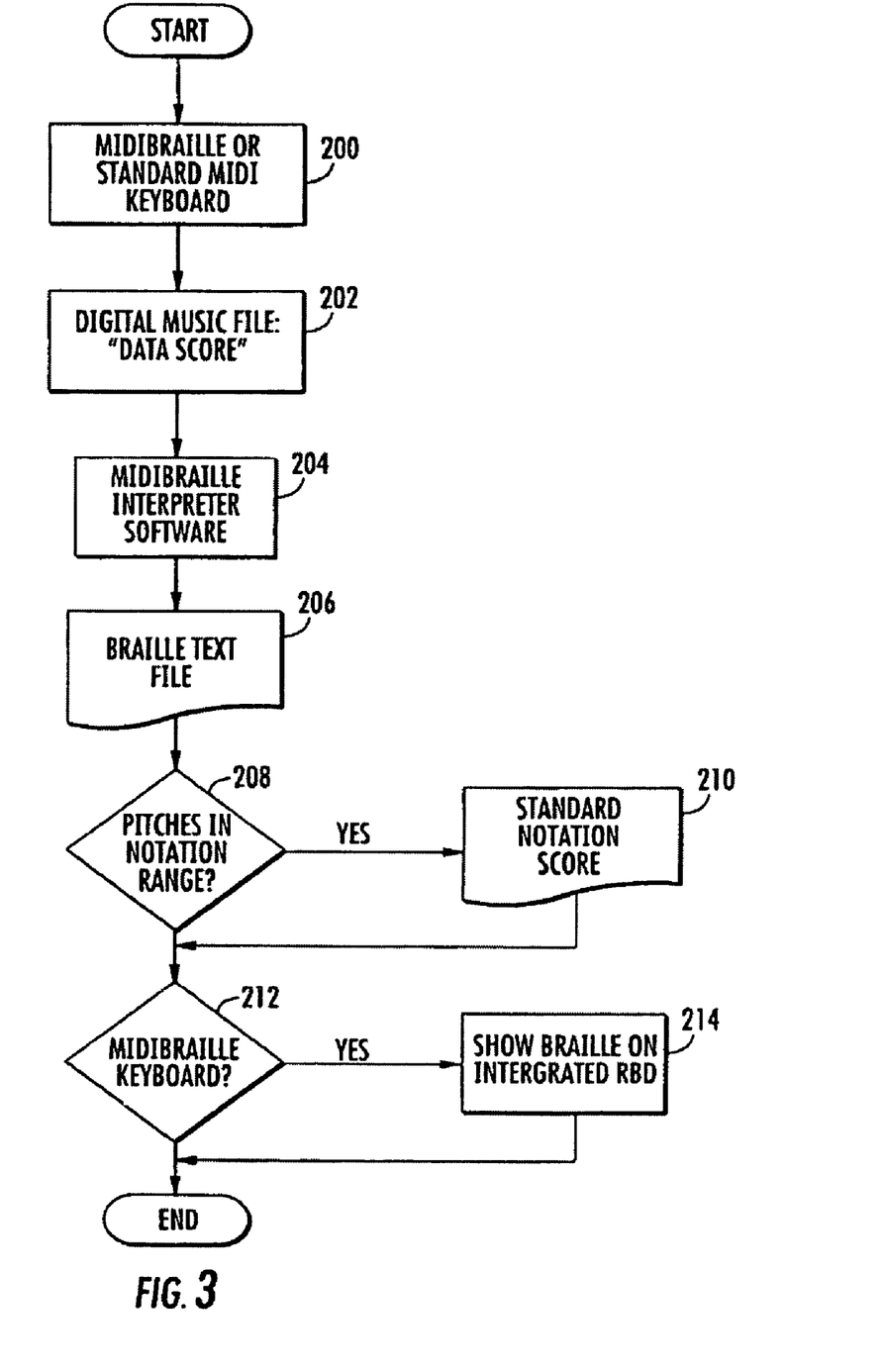
FIG. 3 is a flowchart illustrating, a method for creating Braille and standard notation scores from direct keyboard input.

A flow chart setting out the creation and conversion of a data score is illustrated in FIG. 3. This can be achieved with 6-key input alone, producing only a Braille text file, or 6-key input together with step-time input, in which case a print notation score can be automatically generated by the conversion process. Step-time input typically requires the input of a note's duration from a computer keyboard, followed by the input of a note's pitch from a music keyboard. The Midi-Braille interpreter's treatment of step-time input allows for both the pitch and duration to be input from a Midi music keyboard, for example, using keys in the middle range of the keyboard for the indication of duration. The system begins with note input through a standard Midi keyboard, or a Midi-Braille keyboard incorporating an RBD at step 200. It should be noted that the system may be fully incorporated in a Midi-Braille keyboard, which may include an internal processor loaded with appropriate software to be able to run the conversion routines. Whichever keyboard is used, the system or user assigns designated duration keys in the middle range of the keyboard to enter duration in the same way as traditional step-time input uses input from a computer keyboard. The user then inputs the pitch and duration information for the creation of an intermediate digital music file at step 202. In order to enter the duration information, a duration key is depressed before each note or each sequence of notes having the same duration is played, in order to indicate the duration of that or those notes.

Figure 4:
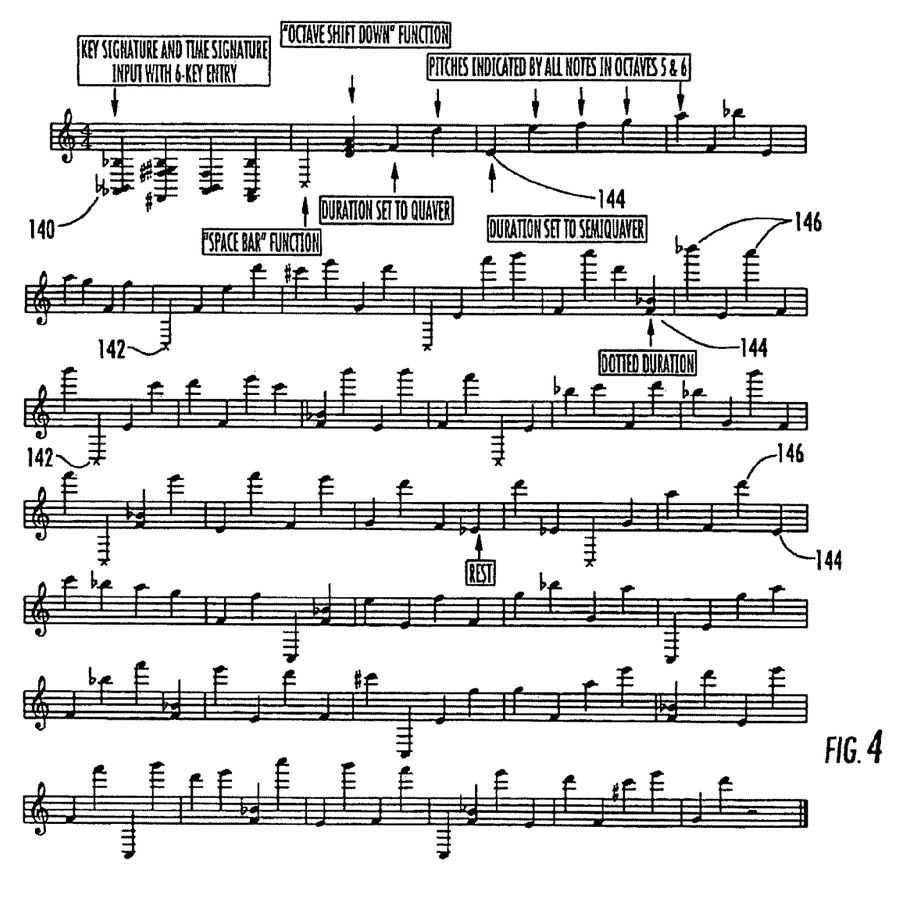
FIG. 4 is an intermediate music score output using the method of FIG. 3.

The input from the keyboard is recorded by the software, as an intermediate Midi file, a digital score, which may be achieved using a standard musical score program, or a file saved in the keyboard's native file format. FIG. 4 shows the typical "data score" output produced after keyboard input. The first notes 140 in the score are representative of non-note information. Lower octave notes 142, such as Octave 2B and Octave 3C-F may represent the ends of each bar. Middle octave notes 144 may represent duration information. For example, Octave 4F may set the note duration to "eighth note" ("quaver") and Octave 4E may set the note duration to "sixteenth note" ("semiquaver"). The notes 146 representing the pitch to be played may be represented in Octaves 5 and 6. It should be appreciated that the output shown in FIG. 4 is not intended to be played by a musician, but rather is used as a music code that is an intermediate step between the keyboard and the Braille output. Additionally, any suitable keys and/or octaves may be assigned to the various functions and the invention is not limited in this regard. This output is then input into the MidiBraille interpreter 24 previously described, at step 204. It should be appreciated that the intermediate score shown in FIG. 4 is not necessarily viewable or accessible by a user of the system, and may simply be generated by the processor during the conversion process.

Figure 5:
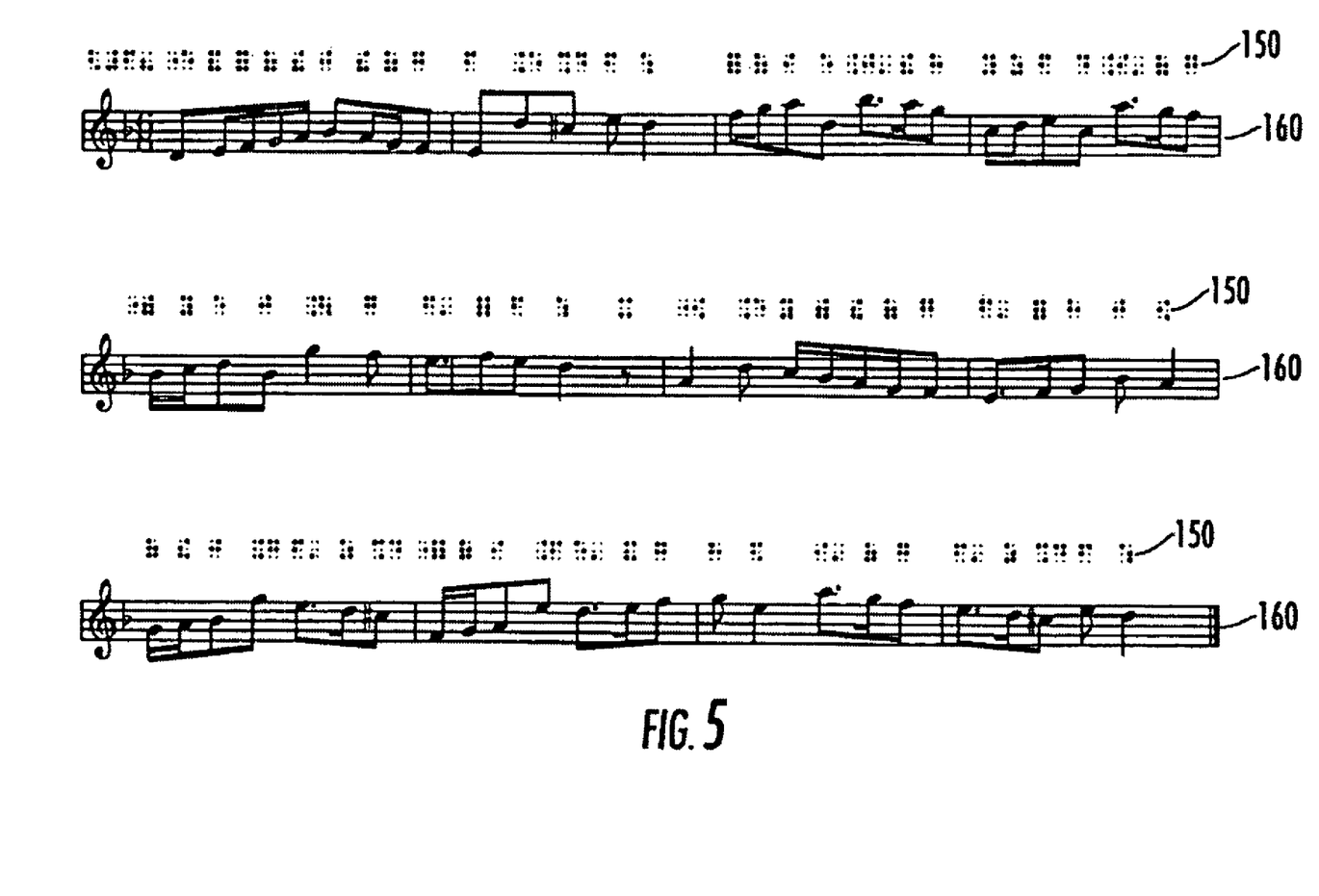
FIG. 5 is a Braille music score and a standard notation score output using the method of FIG. 3.

The MidiBraille interpreter system 24 is run on the intermediate data score, which it interprets to create a Braille text score at step 206, which can then be used to create Braille notation. If the data score contains pitches in the notation range (step 208), the system can also produce a standard notation score at step 210. FIG. 5 illustrates the output produced from the intermediate score of FIG. 4, and shows both Braille notation 150 and the corresponding standard notation score 160. The system can then check if a MidiBraille keyboard is connected thereto, at step 212. If so, the Braille notation 150 can be displayed on the integrated RBD at step 214. If there is no associated RBD, the Braille text score can be saved to disk, or the Braille notation can be printed using an embosser.

Example lookup tables are given below for transcription between Midi pitches and Braille notation, and may be employed for interpreting step-time input or 6-key input. It should be noted that the functions associated with the Midi pitches indicated are not fixed, and so the data listed in the tables is exemplary only. The values in Table A (Braille Typewriter mode) in this instance have been selected to use two groups of three black keys for 6-key input in order to be ergonomically analogous to the keys of a Braille typewriter. Another embodiment might use two major triads for the same functions in order to provide musically meaningful aural feedback. It would also be possible to offer these and other alternatives in a menu of user options, rather than separate embodiments. Table B gives values for the Braille Typewriter mode in which MIDI pitches act as function keys Table C indicates function keys in step-time input mode. A duration key, or key combination, is hit followed by a pitch key. If consecutive pitch keys are input, the previous duration stays in force. A toggle key switches between rests and pitched notes, and octave up/down key combinations extend the range of pitches available.

When a data score is created using only the range of pitches valid in Braille Typewriter Mode, the program creates a text file displaying the Braille cells that have been input. However, if a data score contains any pitches within the range indicated for MidiBraille step-time input, a new Sibelius® (or other musical notation) score is created when the program component is run, showing the standard print equivalent, as well as a Braille text file. Thus, both the notes of a score and the "typed" elements—Braille cells indicating either text or symbols such as slurs—can be input at the same source, and then output as both Braille and print notation scores.

Tables

TABLE A

Braille Typewriter Input - MIDI pitch combinations producing Braille cells

| Braille sign no. | Braille cell | Written notes | MIDI pitches | ASCII | Print char |
|---|---|---|---|---|---|
| 1 | a | | 46 | 97 | |
| 2 | B | | 44, 46 | 98 | |
| 3 | c | | 46, 54 | 99 | |
| 4 | d | | 46, 54, 56 | 100 | |
| 5 | e | | 46, 56 | 101 | |
| 6 | f | | 44, 46, 54 | 102 | |
| 7 | g | | 44, 46, 54, 56 | 103 | |
| 8 | h | | 44, 46, 56 | 104 | |
| 9 | i | | 44, 54 | 105 | |
| 10 | j | | 44, 54, 56 | 106 | |
| 11 | k | | 42, 46 | 107 | |
| 12 | l | | 42, 44, 46 | 108 | |
| 13 | m | | 42, 46, 54 | 109 | |
| 14 | n | | 42, 46, 54, 56 | 110 | |
| 15 | o | | 42, 46, 56 | 111 | |
| 16 | p | | 42, 44, 46, 54 | 112 | |
| 17 | q | | 42, 44, 46, 54, 56 | 113 | |
| 18 | r | | 42, 44, 46, 56 | 114 | |
| 19 | s | | 42, 44, 54 | 115 | |
| 20 | t | | 42, 44, 54, 56 | 116 | |
| 21 | u | | 42, 46, 58 | 117 | |
| 22 | v | | 42, 44, 46, 58 | 118 | |
| 23 | x | | 42, 46, 54, 58 | 120 | |
| 24 | y | | 42, 46, 54, 56, 58 | 121 | |
| 25 | z | | 42, 46, 56, 58 | 122 | |
| 26 | & | | 42, 44, 46, 54, 58 | 38 | |
| 27 | = | | 42, 44, 46, 54, 56, 58 | 61 | |
| 28 | ( | | 42, 44, 46, 56, 58 | 40 | |
| 29 | ! | | 42, 44, 54, 58 | 33 | |
| 30 | ) | | 42, 44, 54, 56, 58 | 41 | |
| 31 | * | | 46, 58 | 42 | |
| 32 | < | | 44, 46, 58 | 60 | |
| 33 | % | | 46, 54, 58 | 37 | |
| 34 | ? | | 46, 54, 56, 58 | 63 | |
| 35 | : | | 46, 56, 58 | 58 | |
| 36 | $ | | 44, 46, 54, 58 | 36 | |
| 37 | ] | | 44, 46, 54, 56, 58 | 93 | |

TABLE A-continued

Braille Typewriter Input - MIDI pitch combinations producing Braille cells

| Braille sign no. | Braille cell | Written notes | MIDI pitches | ASCII | Print char |
|---|---|---|---|---|---|
| 38 | \ | | 44, 46, 56, 58 | 92 | |
| 39 | [ | | 44, 54, 58 | 91 | |
| 40 | w | | 44, 54, 56, 58 | 119 | |
| 41 | 1 | | 44 | 49 | |
| 42 | 2 | | 42, 44 | 50 | |
| 43 | 3 | | 44, 56 | 51 | |
| 44 | 4 | | 44, 56, 58 | 52 | |
| 45 | 5 | | 44, 58 | 53 | |
| 46 | 6 | | 42, 44, 56 | 54 | |
| 47 | 7 | | 42, 44, 56, 58 | 55 | |
| 48 | 8 | | 42, 44, 58 | 56 | |
| 49 | 9 | | 42, 56 | 57 | |
| 50 | 0 | | 42, 56, 58 | 48 | |
| 51 | / | | 42, 54 | 47 | |
| 52 | + | | 42, 54, 58 | 43 | |
| 53 | # | | 42, 54, 56, 58 | 35 | |
| 54 | > | | 42, 54, 56 | 62 | |
| 55 | ' | | 42 | 39 | |
| 56 | - | | 42, 58 | 45 | |
| 57 | @ | | 54 | 64 | |
| 58 | | | 54, 56 | 94 | |
| 59 | _ | | 54, 56, 58 | 95 | |
| 60 | " | | 56 | 34 | |
| 61 | . | | 54, 58 | 46 | |
| 62 | ; | | 56, 58 | 59 | |
| 63 | , | | 58 | 44 | |

TABLE B

Braille Typewriter Input - MIDI pitches acting as function keys

| Written notes | MIDI pitch | Function |
|---|---|---|
| | 47 | Space |
| | 48 | Space |
| | 50 | Space |
| | 52 | Space |
| | 53 | Space |
| | 61 | Return |

TABLE C

MidiBraille Step Input - MIDI pitches acting as function keys

| Written notes | MIDI pitch | Function |
|---|---|---|
| | 62 | Duration: demisemiquaver/thirty-second |
| | 62, 70 | Duration: dotted demisemiquaver/thirty-second |
| | 64 | Duration: semiquaver/sixteenth |
| | 64, 70 | Duration: dotted semiquaver/sixteenth |
| | 65 | Duration: quaver/eighth |
| | 65, 70 | Duration: dotted quaver/eighth |
| | 67 | Duration: crotchet/quarter |
| | 67, 70 | Duration: dotted crotchet/quarter |
| | 69 | Duration: minim/half |
| | 69, 70 | Duration: dotted minim/half |
| | 71 | Duration: semibreve/whole |
| | 70, 71 | Duration: dotted semibreve/whole |
| | 62, 66, 69 | Octave shift up |
| | 62, 65, 69 | Octave shift down |
| | 63 | Toggles between rest and pitched note |
| | 72-96, + | Pitch |
| | octave shift keys | |

A hardware component that can be used in accordance with the present invention is a Midi-Braille keyboard, comprising both a musical Midi keyboard 12 and a refreshable Braille display (RBD) 14. An RBD is a tactile device consisting of a row of 'soft' cells. A soft cell has 6 or 8 pins made of metal or nylon that are controlled electronically to move up and down to display Braille equivalents of characters as they appear on the display of the source system. Soft Braille cells have either 6 or 8 dot pins depending on the model. Advanced Braille code features 8 dot Braille, but most will probably only use the 6 dot code. Dots 7 and 8, if present, can be used to show the position of the cursor in the text or for European 8 dot Braille. They can also be used for advanced math work and for computer coding. A number of cells are placed next to each other to form a soft or refreshable Braille line. As the pins of each cell raise and lower they form a line of Braille text that can be read by touch. Full size Braille lines are 80 cells long—this matches the number of characters across the width of a typical word processor screen. Braille lines with less than 80 cells cope with an 80 character print line by displaying it in stages, e.g. a 20-cell line would display it in four stages.

The invention provides an RBD 14 typically above the music keyboard 12 so that it is easy for a blind musician to read while learning or composing a musical piece, although the RBD can be provided at any accessible location adjacent to or near the music keyboard 12 or in a design which allows it to be positioned by the user. This will make the learning of musical pieces much easier for blind musicians, as they must presently memorize a score prior to playing it, or must keep an embossed score close by and risk losing their place in the score every time they move their hands from score to keyboard and vice versa. The RBD can read a digital source file which is written by the software component. It is known to provide: a visual display of score information on Midi keyboards, and the RBD would replace or be in addition to such a visual display unit.

The present invention may be realized in hardware, software, or a combination of hardware and software. The present invention may be realized in a centralized fashion in one computer system, or in a distributed fashion where different elements are spread across several interconnected computer systems. The present invention may be incorporated directly into a musical keyboard, or may be incorporated into a separate computer attached to a keyboard. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

The invention claimed is:

1. A system for producing Braille musical scores, comprising:
a computer processor;
a music keyboard connected to the computer processor, wherein the computer processor is loaded with software that assigns six keys of the music keyboard to Braille entry, such that depression of any of the assigned six keys, either singly or as a simultaneous key combination, is interpreted by the computer processor as a Braille cell;
means for extracting (1) music note data comprising pitch and duration information, and (2) non-note data comprising text, line, and symbol information from a digital music data input played on the music keyboard;
means for correlating the music note data and the non-note data with Braille cell data to create a digital Braille music score from the Braille cell data representing both music and text information; and
means for outputting a Braille music score from the created digital Braille music score.

2. The system according to claim 1, wherein the means for correlating the music note data and the non-note data with Braille cell data to create a digital Braille music score from the Braille cell data includes a look-up table that correlates Braille cells to pitches in a data score by using Midi pitch numbers as a code or programming language.

3. The system according to claim 1, wherein the digital music data input is saved as a Midi file.

4. The system according to claim 1, wherein the means for correlating the music note data and the non-note data with Braille cell data to create a digital Braille music score from the Braille cell data is configured to create the digital Braille music score directly from Midi files or from digital scores that include Midi pitch information.

5. The system according to claim 2, wherein the digital music data input is six-key input combined with step-time input to produce the Braille music score.

6. The system according to claim 2, wherein the means for outputting a Braille music score comprises an embosser for printing an embossed score, a printer for printing a simulated Braille score, a display for displaying a simulated Braille score, or a refreshable Braille display.

7. The system according to claim 2, wherein the means for outputting a Braille music score comprises a speaker that reproduces the Braille music score to facilitate aural feedback to a user.

8. The system according to claim 2, the system further comprising means for providing aural feedback while the digital music data input is played on the music keyboard.

9. A method for producing Braille musical scores, comprising the steps of:
assigning six keys of a music keyboard to Braille entry such that depression of any of the assigned six keys is interpreted by a computer as a Braille cell;
extracting music note data and non-note data from a digital music data input played on the music keyboard, the music note data comprising pitch information and duration information, the non-note data comprising line, symbol, and text information;
correlating the music note data and the non-note data with Braille cell data in a computer processor using Midi pitch numbers as a programming code to correlate the music note data and the non-note data with the Braille cell data;
creating a digital Braille music score from the Braille cell data; and
outputting a Braille music score from the created digital Braille music score.

10. The method according to claim 9, wherein both the music note data and the non-note data in the digital music data input are entered via a music keyboard which is configured for Braille entry, such that depression of any of six assigned keys, either singly or as a simultaneous key combination, is interpreted by the processor as a Braille cell.

11. The method according to claim 9, wherein the outputted Braille music score is an embossed score, a printed or displayed simulated Braille score, or output on a refreshable Braille display.

12. The method according to claim 9, wherein the outputted Braille music score is aurally reproduced to provide aural feedback to a user.

13. The method according to claim 9, the method further comprising providing aural feedback to a user while the digital music data input is entered via a music keyboard.

14. A machine-readable storage medium having stored thereon a computer program having a plurality of code sections, said code sections executable by a machine for causing the machine to perform the steps of:
assigning six keys of a music keyboard to Braille entry such that depression of any of the assigned six keys is interpreted by a computer as a Braille cell;
extracting music note data and non-note data from a digital music data input played on the music keyboard via a processor, the music note data comprising pitch and duration information, the non-note data comprising line, text, and symbol information;
creating an intermediate Midi file using the music note data and the non-note data extracted via the processor;
interpreting the intermediate Midi file to create Braille cell data via the processor;
creating a digital Braille music score from the Braille cell data via the processor; and
outputting a Braille music score from the created digital Braille music score.

15. A musical instrument comprising:
a processor;
a music keyboard configured for Braille entry connected to the processor, such that depression of any of six assigned keys, either singly or as a simultaneous key combination, is interpreted by the processor as a Braille cell; and an integrated refreshable Braille display connected to the processor, the refreshable Braille display configured to display a Braille music score output by the processor, wherein the processor includes memory storing software that when executed receives as input musical note information comprising pitch and duration information, and non-note information comprising text, line and symbol information played on the music keyboard configured for Braille entry, translates the musical note and non-note information into Braille cell identifications based upon Midi information, and displays the identified Braille cells on the refreshable Braille display such that feedback is provided to a user after entering musical note and non-note information via the music keyboard configured for Braille entry.

16. The musical instrument according to claim 15, wherein the non-note data includes text, line, and symbol information that is entered via the music keyboard configured for Braille entry.

17. The musical instrument according to claim 16, wherein the processor translates the musical note and the non-note data into Braille cell identifications using Midi information as a programming code to create an intermediate score.

18. The musical instrument according to claim 16, wherein the refreshable Braille display is provided above the music keyboard.

19. The musical instrument according to claim 16, wherein the refreshable Braille display and the music keyboard are provided in one piece.

20. The musical instrument according to claim 16, wherein the refreshable Braille display is provided as a repositionable unit.

21. The musical instrument according to claim 16, wherein the processor reads and/or writes to a digital storage device.

* * * * *